US 9,544,382 B2

(12) United States Patent
Bosworth et al.

(10) Patent No.: US 9,544,382 B2
(45) Date of Patent: *Jan. 10, 2017

(54) PROVIDING CONTENT ITEMS BASED ON USER AFFINITY IN A SOCIAL NETWORK ENVIRONMENT

(71) Applicant: Facebook, Inc., Menlo Park, CA (US)

(72) Inventors: Andrew G. Bosworth, Palo Alto, CA (US); Chris Cox, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,770

(22) Filed: Oct. 28, 2015

(65) Prior Publication Data

US 2016/0065681 A1    Mar. 3, 2016

Related U.S. Application Data

(63) Continuation of application No. 14/599,441, filed on Jan. 16, 2015, now Pat. No. 9,183,574, which is a continuation of application No. 13/846,890, filed on Mar. 18, 2013, now Pat. No. 8,984,079, which is a continuation of application No. 11/503,093, filed on Aug. 11, 2006, now Pat. No. 8,402,094.

(51) Int. Cl.
| | |
|---|---|
| *G06F 15/16* | (2006.01) |
| *H04L 29/08* | (2006.01) |
| *G06Q 30/08* | (2012.01) |
| *G06Q 30/02* | (2012.01) |
| *G06Q 50/00* | (2012.01) |
| *H04L 12/58* | (2006.01) |

(52) U.S. Cl.
CPC .......... *H04L 67/22* (2013.01); *G06Q 30/0269* (2013.01); *G06Q 30/08* (2013.01); *G06Q 50/01* (2013.01); *H04L 51/32* (2013.01); *H04L 67/306* (2013.01)

(58) Field of Classification Search
None
See application file for complete search history.

(56) References Cited

U.S. PATENT DOCUMENTS

| | | |
|---|---|---|
| 5,937,413 A | 8/1999 | Hyun et al. |
| 6,029,141 A | 2/2000 | Bezos et al. |
| 6,029,195 A | 2/2000 | Herz |
| 7,013,292 B1 | 3/2006 | Hsu et al. |
| 7,249,123 B2 | 7/2007 | Elder et al. |
| 7,269,590 B2 | 9/2007 | Hull et al. |
| 7,359,894 B1 * | 4/2008 | Liebman .......... G06F 17/30867 |

(Continued)

OTHER PUBLICATIONS

Adamic, L. et al., "Friends and Neighbors on the Web," Social Networks, 2003, pp. 211-230, vol. 25.

(Continued)

*Primary Examiner* — Thomas Dailey
(74) *Attorney, Agent, or Firm* — Fenwick & West LLP

(57) ABSTRACT

A system and method for measuring user affinity in a social network environment is provided. One or more activities performed by a user associated with a social network environment are monitored. A relationship associated with the one or more activities is identified. An affinity for one or more objects associated with the social network environment is then determined based on the one or more activities and the relationship.

20 Claims, 5 Drawing Sheets

(56) References Cited

U.S. PATENT DOCUMENTS

| | | | |
|---|---|---|---|
| 7,480,867 B1 | 1/2009 | Racine et al. | |
| 7,669,123 B2 | 2/2010 | Zuckerberg et al. | |
| 7,725,492 B2 | 5/2010 | Sittig et al. | |
| 7,797,256 B2 | 9/2010 | Zuckerberg et al. | |
| 7,809,805 B2 | 10/2010 | Stremel et al. | |
| 7,827,208 B2 | 11/2010 | Bosworth et al. | |
| 7,827,265 B2 | 11/2010 | Cheever et al. | |
| 7,933,810 B2 | 4/2011 | Morgenstern | |
| 7,945,653 B2 | 5/2011 | Zuckerberg et al. | |
| 7,970,657 B2 | 6/2011 | Morgenstern | |
| 8,027,943 B2 | 9/2011 | Juan et al. | |
| 8,136,145 B2 | 3/2012 | Fetterman et al. | |
| 8,171,128 B2 | 5/2012 | Zuckerberg et al. | |
| 8,204,952 B2 | 6/2012 | Stremel et al. | |
| 8,225,376 B2 | 7/2012 | Zuckerberg et al. | |
| 8,249,943 B2 | 8/2012 | Zuckerberg et al. | |
| 8,296,373 B2 | 10/2012 | Bosworth et al. | |
| 8,549,651 B2 | 10/2013 | Callahan et al. | |
| 8,627,506 B2 | 1/2014 | Vera et al. | |
| 8,732,846 B2 | 5/2014 | D'Angelo et al. | |
| 8,832,556 B2 | 9/2014 | Steinberg | |
| 8,887,066 B1 | 11/2014 | Deng et al. | |
| 2001/0037721 A1 | 11/2001 | Hasegawa et al. | |
| 2002/0059201 A1 | 5/2002 | Work | |
| 2003/0145093 A1 | 7/2003 | Oren et al. | |
| 2003/0222918 A1 | 12/2003 | Coulthard | |
| 2003/0225632 A1 | 12/2003 | Tong et al. | |
| 2004/0024846 A1 | 2/2004 | Randall et al. | |
| 2004/0088177 A1 | 5/2004 | Travis et al. | |
| 2004/0148275 A1 | 7/2004 | Achlioptas | |
| 2005/0021750 A1* | 1/2005 | Abrams | G06Q 10/10 709/225 |
| 2005/0114759 A1 | 5/2005 | Williams et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171832 A1* | 8/2005 | Hull | G06Q 30/0201 705/7.29 |
| 2005/0171955 A1* | 8/2005 | Hull | G06Q 50/01 |
| 2005/0177358 A1* | 8/2005 | Melomed | G06F 17/3043 704/2 |
| 2005/0177385 A1 | 8/2005 | Hull et al. | |
| 2005/0197846 A1* | 9/2005 | Pezaris | G06Q 10/0637 705/319 |
| 2005/0198020 A1 | 9/2005 | Garland et al. | |
| 2005/0198031 A1* | 9/2005 | Pezaris | H04L 12/588 |
| 2005/0198305 A1* | 9/2005 | Pezaris | H04L 12/585 709/227 |
| 2005/0203807 A1 | 9/2005 | Bezos et al. | |
| 2005/0216300 A1 | 9/2005 | Appelman et al. | |
| 2005/0216550 A1 | 9/2005 | Paseman et al. | |
| 2005/0235062 A1 | 10/2005 | Lunt et al. | |
| 2005/0256756 A1* | 11/2005 | Lam | G06Q 30/02 705/7.33 |
| 2005/0267766 A1* | 12/2005 | Galbreath | G06Q 30/02 705/319 |
| 2006/0026147 A1* | 2/2006 | Cone | G06F 17/30867 |
| 2006/0041543 A1 | 2/2006 | Achlioptas | |
| 2006/0042483 A1 | 3/2006 | Work et al. | |
| 2006/0048059 A1* | 3/2006 | Etkin | G06F 17/30699 715/745 |
| 2006/0052091 A1 | 3/2006 | Onyon et al. | |
| 2006/0064431 A1 | 3/2006 | Kishore et al. | |
| 2006/0072721 A1* | 4/2006 | Wisniewski | G06F 17/30905 379/88.22 |
| 2006/0080613 A1 | 4/2006 | Savant | |
| 2006/0085419 A1 | 4/2006 | Rosen | |
| 2006/0136419 A1 | 6/2006 | Brydon et al. | |
| 2006/0143067 A1* | 6/2006 | Calabria | G06Q 10/10 705/26.1 |
| 2006/0143183 A1* | 6/2006 | Goldberg | G06F 17/3089 |
| 2006/0161599 A1 | 7/2006 | Rosen | |
| 2006/0184617 A1 | 8/2006 | Nicholas et al. | |
| 2006/0190281 A1 | 8/2006 | Kott et al. | |
| 2006/0194186 A1 | 8/2006 | Nanda | |
| 2006/0218225 A1 | 9/2006 | Hee Voon et al. | |
| 2006/0229063 A1 | 10/2006 | Koch | |
| 2006/0230061 A1 | 10/2006 | Sample et al. | |
| 2006/0242581 A1* | 10/2006 | Manion | G06Q 10/10 715/733 |
| 2006/0247940 A1 | 11/2006 | Zhu et al. | |
| 2006/0248573 A1 | 11/2006 | Pannu et al. | |
| 2006/0256008 A1 | 11/2006 | Rosenberg | |
| 2006/0265227 A1 | 11/2006 | Sadamura et al. | |
| 2006/0293976 A1 | 12/2006 | Nam | |
| 2007/0112645 A1 | 5/2007 | Traynor et al. | |
| 2007/0124493 A1* | 5/2007 | Fogg | H04L 29/06027 709/231 |
| 2007/0162432 A1 | 7/2007 | Armstrong et al. | |
| 2007/0174389 A1 | 7/2007 | Armstrong et al. | |
| 2007/0192129 A1* | 8/2007 | Fortuna | G06Q 99/00 705/1.1 |
| 2007/0192299 A1 | 8/2007 | Zuckerberg et al. | |
| 2007/0208916 A1 | 9/2007 | Tomita | |
| 2007/0282987 A1 | 12/2007 | Fischer et al. | |
| 2008/0005076 A1 | 1/2008 | Payne et al. | |
| 2008/0010343 A1 | 1/2008 | Escaffi et al. | |
| 2008/0027921 A1* | 1/2008 | Chandrasekar | G06F 17/3087 |
| 2008/0033776 A1 | 2/2008 | Marchese | |
| 2008/0040428 A1 | 2/2008 | Wei et al. | |
| 2008/0040475 A1 | 2/2008 | Bosworth et al. | |
| 2008/0070697 A1 | 3/2008 | Robinson et al. | |
| 2008/0086458 A1 | 4/2008 | Robinson et al. | |
| 2008/0126411 A1 | 5/2008 | Zhuang et al. | |
| 2008/0133495 A1 | 6/2008 | Fischer | |
| 2008/0133649 A1 | 6/2008 | Pennington et al. | |
| 2008/0134035 A1 | 6/2008 | Pennington et al. | |
| 2008/0189292 A1 | 8/2008 | Stremel et al. | |
| 2008/0288612 A1 | 11/2008 | Kwon | |
| 2009/0031301 A1 | 1/2009 | D'Angelo et al. | |
| 2009/0048922 A1 | 2/2009 | Morgenstern et al. | |
| 2009/0049070 A1 | 2/2009 | Steinberg | |
| 2009/0049127 A1 | 2/2009 | Juan et al. | |

OTHER PUBLICATIONS

Australian Patent Office, Examiner's First Report, Australian Patent Application No. 2007-284817, Jun. 15, 2011, two pages.
Canadian Intellectual Property Office, Office Action, Canadian Patent Application No. 2,660,461, Oct. 25, 2011, three pages.
Chipin, "How Chipin Works: An Overview," [Online] [Retrieved Dec. 15, 2006] Retrieved from the Internet <http://web.archive.org/web/20061215090739/www.chipin.com/overview.>- ;.
Dholaki, U. et al., "A Social Influence Model of Consumer Participation in Network-and Small-group-based Virtual Communities," International Journal of Research in Marketing, 2004, pp. 241-263, vol. 21.
Flores, F. et al. "Computer systems and the design of organizational interaction." In ACM Transactions on Information Systems (TOIS), vol. 6, Issue 2, Apr. 1988.
Japanese Patent Office, Notice of Grounds for Rejection, Japanese Patent Application No. P2009-523626, May 22, 2012, four pages (with English translation).
Japanese Patent Office, Notice of Grounds for Rejection, Japanese Patent Application No. P2009-523826, Feb. 5, 2013, five pages.
Parzek, E., "Social Networking to Chipin to a Good Cause," Business Design Studio, Jun. 29, 2006, two pages. [Online] [Retrieved Jun. 20, 2008] Retrieved from the Internet <http://www.businessdesignstudio.com/resources/blogger/2006/06social-n-etwo-rking-tochipin-togood.html.>.
PCT International Search Report and Written Opinion, PCT/US2007/017578, Jul. 3, 2008.
Takai, K., et al., "ACS: A Social Networking System for Various Human Relations," IPSJ Symposium Series, 2006, pp. 577-580, with English abstract.
Tsuruoka, N., "Web 2.0 Practice Technique, Google/Yahoo)/REST," May 25, 2006, pp. 84-90, vol. 32, First Edition, Web+DB Press, Japan.

(56) References Cited

OTHER PUBLICATIONS

U.S. Appl. No. 11/493,291, filed Jul. 25, 2006, Mark Zuckerberg, Systems and Methods for Dynamically Generating a Privacy Summary.
U.S. Appl. No. 11/499,093, filed Aug. 2, 2006, Mark Zuckerberg, Systems and Methods for Dynamically Generating Segmented Community Flyers.
U.S. Appl. No. 11/502,757, filed Aug. 11, 2006, Andrew Bosworth, Systems and Methods for Generating Dynamic Relationship-Based Content Personalized for Members of a Web-Based Social Network.
U.S. Appl. No. 11/503,037, filed Aug. 11, 2006, Mark Zuckerberg, Systems and Methods for Providing Dynamically Selected Media Content to a User of an Electronic Device in a Social Network Envrioment.
U.S. Appl. No. 11/503,242, filed Aug. 11, 2006, Mark Zuckerberg, System and Method for Dynamically Providing a News Feed About a User of a Social Network.
U.S. Appl. No. 11/580,210, filed Oct. 11, 2006, Mark Zuckerberg, System and Method for Tagging Digital Media.
U.S. Appl. No. 11/639,655, filed Dec. 14, 2006, Mark Zuckerberg, System and Method for Social Mapping.
U.S. Appl. No. 11/646,206, filed Dec. 26, 2006, Aaron Sittig, Systems and Methods for Generating a Social Timeline.
U.S. Appl. No. 11/701,566, filed Feb. 2, 2007, Jed Stremel, System and Method for Automatic Population of a Contact File with Contact Content and Expression Content.
U.S. Appl. No. 11/701,595, filed Feb. 2, 2007, Ezra Callahan, System and Method for Determining a Trust Level in a Social Network Environment.
U.S. Appl. No. 11/701,698, filed Feb. 2, 2007, Jed Stremel, System and Method for Digital File Distribution.
U.S. Appl. No. 11/701,744, filed Feb. 2, 2007, Andrew Bosworth, System and Method for Curtailing Objectionable Behavior in a Web-Based Social Network.
U.S. Appl. No. 11/713,455, filed Feb. 28, 2007, Jed Stremel, Systems and Methods for Automatically Locating Web-Based Social Network Members.
U.S. Appl. No. 11/726,962, filed Mar. 23, 2007, Charlie Cheever, System and Method for Confirming an Association in a Web-Based Social Network.
U.S. Appl. No. 11/796,184, filed Apr. 27, 2007, Jared S. Morgenstern, System and Method for Giving Gifts and Displaying Assets in a Social Network Environment.
U.S. Appl. No. 11/893,493, filed Aug. 15, 2007, Arieh Steinberg, Web-Based Social Network Badges.
U.S. Appl. No. 11/893,559, filed Aug. 15, 2007, Adam D'Angelo, Platform for Providing a Social Context to Software Applications.
U.S. Appl. No. 11/893,797, filed Aug. 16, 2007, Yun-Fang Juan, System and Method for Invitation Targeting in a Web-Base Social Network.
U.S. Appl. No. 11/893,820, filed Aug. 16, 2007, Yun-Fang Juan, System and Methods for Keyword Selection in a Web-Based Social Network.
U.S. Appl. No. 11/899,426, filed Sep. 5, 2007, Jared Morgenstern, System and Method for Collectively Giving Gifts in a Social Network Environment.
U.S. Appl. No. 11/982,974, filed Nov. 5, 2007, Inventors: Sanghvi et al., Systems and Methods for a Web-Based Social Networking Environment Integrated Within One or More Computing and/or Networking Applications.
U.S. Appl. No. 12/072,003, filed Feb. 21, 2008, Arich Steinberg, Systems and Methods for Implementation of a Structured Query Language Interface in a Distributed Database Environment.
U.S. Appl. No. 12/077,070, filed Mar. 13, 2008, Dave Fetterman, Systems and Methods for Network Authentication.
U.S. Appl. No. 12/080,808, filed Apr. 2, 2008, Peter Deng, Systems and Methods for Calendaring.
U.S. Appl. No. 12/151,734, filed May 7, 2008, Jared Morgenstern, Systems and Methods for Classified Advertising in an Authenticated Web-Based Social Network.
U.S. Appl. No. 12/154,504, filed May 23, 2008, Adam D'Angelo, Personalized Platform for Accessing Internet Applications.
U.S. Appl. No. 12/154,886, filed May 27, 2008, Nico Vera, Systems and Methods for Providing Privacy Settings for Applications Associated with an User Profile.
U.S. Appl. No. 12/156,091, filed May 28, 2008, Mark Zuckerberg, Systems and Methods for Auction-Based Polling.
U.S. Appl. No. 60/965,624, filed Aug. 20, 2007, Inventors: Adam D'Angelo et al., Systems and Methods for Targeting Advertisements in a Social Network Environment.
U.S. Appl. No. 60/965,852, filed Aug. 22, 2007, Inventors: Adam D'Angelo et al., Systems and Methods for Advertising.
U.S. Appl. No. 60/966,442, filed Sep. 28, 2007, Inventors: Ezra Callahan et al., System and Method for Incorporating an Entity or Group other than a Natural Person into a Social Network.
U.S. Appl. No. 60/967,842, filed Sep. 7, 2007, Inventors: Ezra Callahan, et al., Systems and Methods for Dynamically Updating Privacy Settings.
U.S. Appl. No. 61/005,614, filed Dec. 5, 2007, Inventors: Wong et al., Systems and Methods for Community Translations on a Web-Based Social Network.
United States Advisory Action, U.S. Appl. No. 11/503,093, Jun. 16, 2010, three pages.
United States Office Action, U.S. Appl. No. 11/503,093, Apr. 30, 2009, eleven pages.
United States Office Action, U.S. Appl. No. 11/503,093, Apr. 5, 2012, eleven pages.
United States Office Action, U.S. Appl. No. 11/503,093, Jun. 23, 2011, twelve pages.
United States Office Action, U.S. Appl. No. 11/503,093, Mar. 18, 2010, twelve pages.
United States Office Action, U.S. Appl. No. 11/503,093, May 29, 2008, thirteen pages.
United States Office Action, U.S. Appl. No. 11/503,093, Nov. 16, 2010, nine pages.
United States Office Action, U.S. Appl. No. 11/503,093, Nov. 24, 2008, twenty-six pages.
United States Office Action, U.S. Appl. No. 13/846,890, Aug. 18, 2014, thirteen pages.

* cited by examiner

PROVIDING CONTENT ITEMS BASED ON USER AFFINITY IN A SOCIAL NETWORK ENVIRONMENT

CROSS REFERENCE TO RELATED APPLICATIONS

This application is a continuation of U.S. application Ser. No. 14/599,441, filed Jan. 16, 2015, which is a continuation of U.S. application Ser. No. 13/846,890, filed Mar. 18, 2013, now U.S. Pat. No. 8,984,079, which is a continuation of U.S. application Ser. No. 11/503,093, filed Aug. 11, 2006, now U.S. Pat. No. 8,402,094, all of which are incorporated by reference in their entirety.

BACKGROUND

The present invention relates generally to social networking, and more particularly to systems and methods for measuring user affinity in a social network environment.

Conventionally, a user of a social networking website connects with other users by providing information about the user to the social network website for access by other users. For example, a user may post contact information, background information, current job position, hobbies, and so forth. Other users may review this information by browsing through profiles or entering keyword(s) into an internal search engine that searches the social networking site for profiles containing the keyword(s).

Recently, social networking websites have developed systems for better connecting users to the content most relevant to each particular user. For example, users may be grouped together in one or more groupings based on any common factor listed in their profile, such as geographical location, employer, job type, music preferences, and so forth. Parties within and outside of the social networking website utilize these groupings to target information that would be of interest to that particular community. For example, a social networking site may display banner ads advertising a concert too all users who list the performing band on their profile. As social networking has grown more popular, however, users and the information they provide on their profiles has greatly increased. Consequently, users are often inundated with information that is not necessarily the most relevant to a particular user.

SUMMARY

The present invention provides a system and method for measuring user affinity in a social network environment. One or more activities performed by a user associated with a social network environment are monitored. A relationship associated with the one or more activities is identified. An affinity for one or more objects associated with the social network environment is then determined based on the one or more activities and the relationship.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method for measuring user affinity in a social network environment is provided. The user affinity may be measured by utilizing relationships the user has with other users. The user affinity may also be measured by monitoring the user's interaction with content, such as stories, headlines, or other user's profiles, and/or the user's interaction with other users, directly, such as emails to other users. The user affinity may be utilized to generate media for the user about other users, such as stories about other users with which the user has a relationship.

Figure 1:
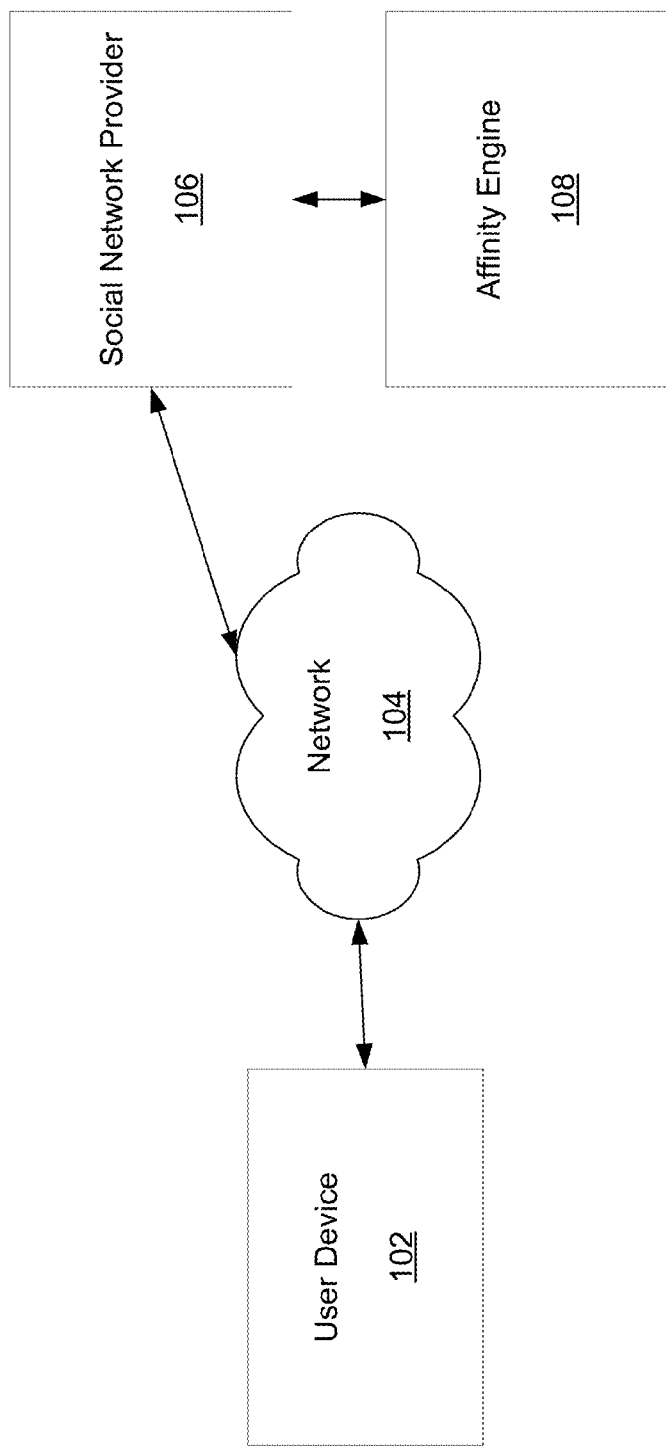
FIG. 1 illustrates a schematic diagram of an exemplary environment for measuring user affinity in a social network environment.

FIG. 1 illustrates a schematic diagram of an exemplary environment for measuring user affinity in a social network environment. One or more users, such as a user at a user device 102, are coupled to a social network provider 106 via a network 104.

The social network provider 106 may comprise any user or entity that provides social networking services, communication services, dating services, and so forth. For example, the social network provider 106 may host a website that allows two or more users, such as the user at the user device 102, to communicate with one another via the website. In one instance, a first user associated with the user device 102 may communicate with one or more second users associated with one or more second user devices via a social networking website associated with the social network provider 106. The social networking website offers the user an opportunity to connect or reconnect with the one or more second users who attended, for example, the same university as the user.

An affinity engine 108 is coupled to the social network provider 106. The affinity engine 108 utilizes data, such as data about one or more users, to measure the users' affinity for one or more items of media or any other content. According to some embodiments, the user device 102 may be directly coupled to the affinity engine 108. According to other embodiments, the affinity engine 108 comprises a module associated with the social network provider 106.

Figure 2:
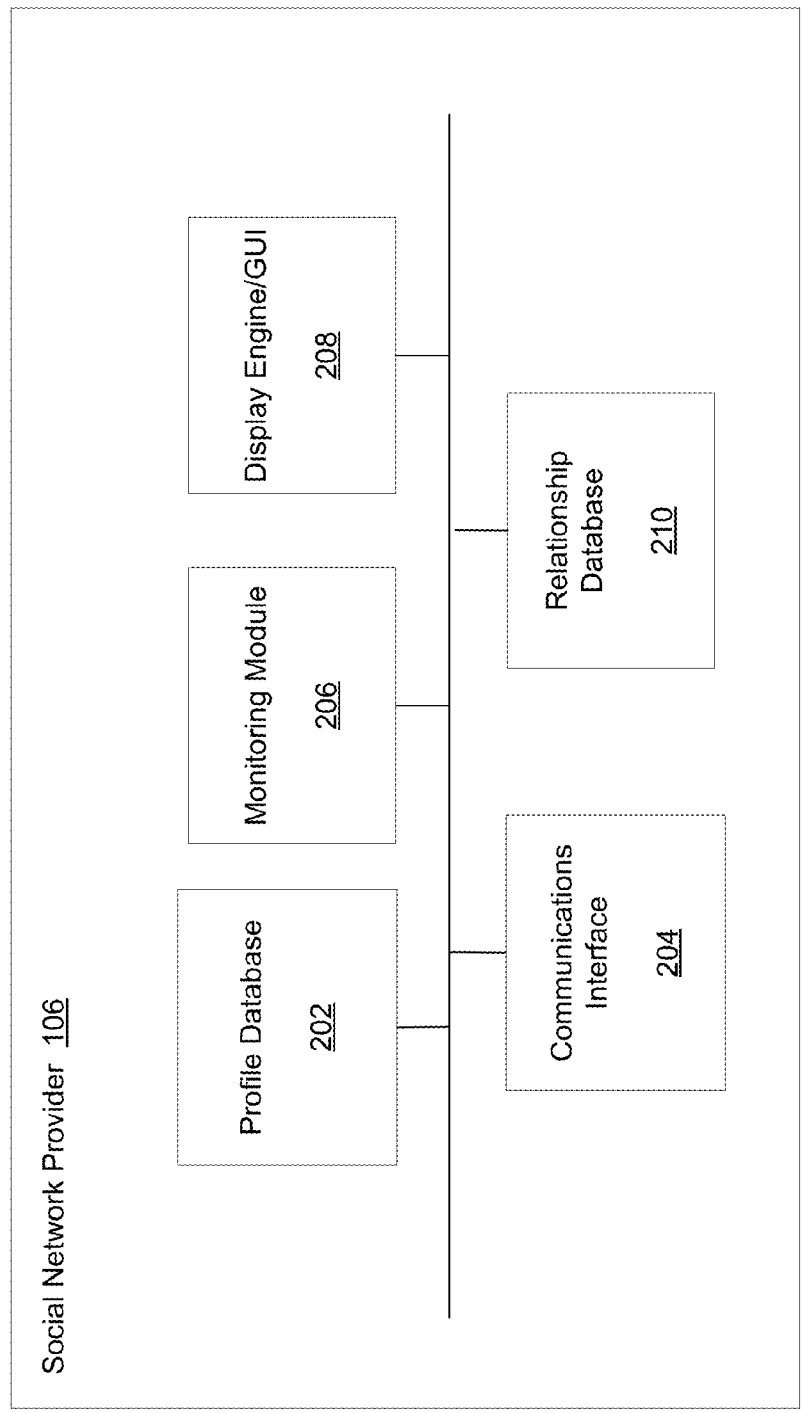
FIG. 2 illustrates a schematic diagram of an exemplary social network provider.

Referring now to FIG. 2, a schematic diagram of an exemplary social network provider, such as the social network provider 106 discussed in FIG. 1, is shown. A profile database 202 is provided for storing data associated with each of the users, such as the user associated with the user device 102. When a user subscribes to services provided by the social network provider 106, a user profile may be generated for the user. For example, the user may select privacy settings, provide contact information, or group other users according to one or more categories. When the user adds additional information to the user profile, such as adding additional contacts, the user profile in the profile database 202 may be updated with the information added. The user profile may be stored, modified, added, and so forth to any storage medium.

According to some embodiments, the user profile is created outside of the social network environment and provided to or accessed by the social network provider 106.

Alternatively, the profile database 202 may be located remotely and accessed by the social network provider 106.

The social network provider 106 includes a communications interface 204 for communicating with the users, such as via the user device 102 described herein, over the network 104. The user device 102 communicates various types of information, such as privacy settings selections, groupings of other users, and so forth, to the social network provider 106 via the communications interface 204. Any type of communications interface 204 is within the scope of various embodiments.

A monitoring module 206 tracks one or more user activities on the social networking website. For example, the monitoring module 206 can track user interaction with one or more items of media, such as news stories, other users' profiles, email to other users, chat rooms provided via the social network provider 106, and so forth. Any type of user activity can be tracked or monitored via the monitoring module 206. The information, people, groups, stories, and so forth, with which the user interacts, may be represented by one or more objects, according to exemplary embodiments.

A relationship the user has with one or more other users may be defined according to the user's profile and/or according to other users with which the monitoring module 206 detects user interaction. For example, a particular user may define a relationship with his wife or a friend in the particular user's profile. However, a relationship may also be defined by the social network provider 106 when the particular user interacts with one or more other users that share a common interest in a musical band, for instance. Further, a strength of the relationship defined in the particular user's profile, such as wife or friend, may be updated or adjusted according to how often the particular user interacts with the wife or the friend, for example.

A display engine/GUI 208 may also be provided by the social network provider 106. The display engine/GUI 208 displays the one or more items of media, profile information, and so forth to the users. The users can interact with the social network provider 106 via the display engine/GUI 208. For example, the users can select privacy settings, access their own user profile, access other users' information available via the social network provider, and so forth via the display engine/GUI 208.

A relationship database 210 is provided for storing relationship data about each user. The user can specify relationships with one or more other users via the user profile, or by any other means. The user can assign categories, groups, networks, and so forth to the one or more other users with which the user has a relationship. The relationship, for example, may specify that a user is a family member, schoolmate, ex-girlfriend, and so forth. Any type of relationship may be specified.

According to some embodiments, the social network provider 106 may determine a relationship for the user. For example, if the user establishes communications with another user interested in Woody Allen movies, the social network provider 106 may assign the relationship of fellow Woody Allen movie fan. The social network provider 106 may inquire whether or not the user wants to add the other user as a fellow Woody Allen fan, in one instance. Alternatively, the social network provider 106 may utilize a common interest in Woody Allen movies as a variable to measure user affinity, without inquiring whether the user wants to add the other user to the user's profile, according to some embodiments.

A relationship may be assigned based on the user's interaction with other users or with any type of content. The user may have more than one relationship with other users or with content, according to exemplary embodiments. For example, the user's brother qualifies as one type of relationship, while the fact that the user's brother attended the same university as the user may qualify as another relationship. Any number of relationships may be established for each user and/or for each activity performed by the user in the social network environment.

According to exemplary embodiments, one or more networks may be provided for each user. For example, the user may have a network comprised of people grouped according to a university attended, a network comprised of people grouped according to the user's geographical location of residence, a network comprised of people grouped according to a common field of work, a network comprised of people grouped according to a particular business, and so forth. As discussed herein, a common network may establish a relationship between the user and other users in the common network, for example.

Any type of network may be provided by the social network provider 106. In other words, a network may comprise people grouped according to any type of category, such as various social networks described herein, like "friends", "geographical location", and so forth. The user may specify the networks, the categories, subcategories, and so forth and/or the networks, the categories, the subcategories, and so on may be predetermined by the social network provider 106. The networks, the categories, the subcategories, and so forth may comprise a relationship with the user, as discussed herein, but do not necessarily comprise the only relationship the user has with the other users.

Although the social network provider 106 is described as being comprised of various components (the profile database 202, the communications interface 204, the monitoring module 206, the display engine/GUI 208, and the relationship database 210), fewer or more components may comprise the social network provider 106 and still fall within the scope of various embodiments.

Figure 3:
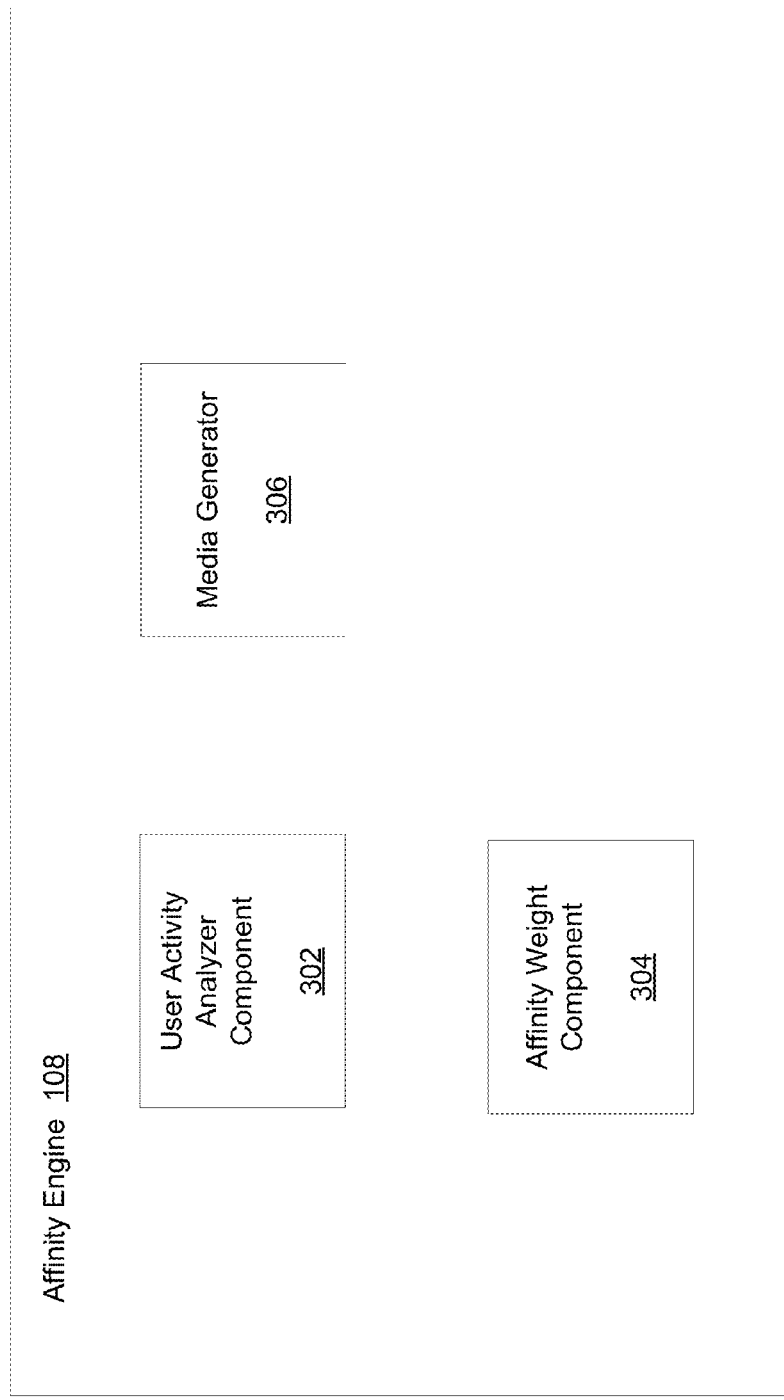
FIG. 3 illustrates a schematic diagram of an exemplary affinity engine.

FIG. 3 illustrates a schematic diagram of an exemplary affinity engine. A user activity analyzer component 302 accesses the one or more user activities detected by the monitoring module 206. The user activity analyzer component 302 analyzes the user activities to determine whether one or more of the activities indicate an affinity for subject matter, content, other users, and so forth. Optionally, the user activities may be stored in a user activity storage medium (not shown) associated with the affinity engine 108 and/or the social network provider 106.

An affinity assignment component 304 can access data from the relationship database 210 and from the user activity analyzer component 302 to assign an affinity rating and/or weight to subject matter, other users, and so forth, for each user. For example, a particular user's wife is assigned a rating based on a spousal relationship with the particular user, while the particular user's brother receives a different rating based on a sibling relationship. The user activity may be weighted differently from the user relationship. For example, the rating assigned to a user activity may comprise sixty percent (60%) of the overall affinity, while the relationship associated with the user activity comprises the other forty percent (40%) of the overall affinity determined for the user. The weights may be static or the weights may change according to a type of relationship, a type of user activity, and so forth.

Based on the one or more user activities and the relationships, an overall affinity for past, present, or future content can be determined by the affinity assignment component

304. According to exemplary embodiments, a particular user activity is assigned both a rating and a weight while a relationship associated with the particular user activity is assigned a rating and a correlating weight (e.g., so the weights total 100%). The ratings may be combined according to their weights to determine an overall affinity for the user. For example, a particular user may receive content associated with the particular user's wife as a lower priority than content associated with the particular user's brother because although the particular user's wife has a higher rated relationship, the particular user accesses content about his brother more often. Depending upon the weights assigned to the activities and relationships for the particular user, the overall affinity may be determined to be higher for content about the user's brother than for content about the user's wife, in one instance. Any type of variables, such as time since information was accessed, frequency of access, relationship to person about which information was accessed, relationship to person sharing common interests in information accessed, relationship with the actual information accessed, and so forth, may be considered when assigning ratings and weights to the activities performed by the user and the relationships associated with the activities.

According to exemplary embodiments, an overall affinity for the user for each user, subject matter, type of content, and so forth may be established. The overall affinity may change based on continued monitoring of the user's activities or the overall affinity may be utilized to establish ratings for activities and/or relationships.

The weights and/or the ratings may vary for the one or more user activities and for the relationships associated with the one or more user activities, as discussed herein. According to exemplary embodiments, a user activity is assigned an initial rating that is adjusted according to the rating and the affinity weight assigned to the relationship data associated with the user activity. Any type of process may be employed for assigning, combining, averaging, and so forth the ratings and the weights assigned to the one or more user activities and the relationships associated with the one or more user activities. As discussed herein, user activities may be utilized as feedback for adjusting ratings and weights assigned to the user activities and/or the relationships associated with the user activities. For example, the user's relationship with an existing girlfriend may rate higher than a relationship rating with the user's ex-girlfriend, but the affinity weight for the ex-girlfriend may be higher based on the number of times the user has accessed one or more items of media or other content about the ex-girlfriend in the past month.

Any type of overall affinity may be determined utilizing any number of variables representative of activities and relationships, such as statistical metrics, long term averages of user interactions, short term averages of user interactions, decay factors (e.g., the rate at which values associated with user interactions erodes through time), time, feedback, and so forth. The ratings and weights may be continuously updated based on continued tracking of the one or more user activities by the monitoring module 206. Any rating, weight, and so forth may be assigned to each variable that is considered in determining an overall affinity. As discussed herein, the overall affinity may be established for various types of content, other users, categories of content, such as parties, and so forth.

The overall affinity determined by the affinity assignment component 304 may be utilized for providing various types of information, such as media, to the users. For example, the user may be presented with updated photos from a photo album from another user for which the user has a high overall affinity, stories about another user for which the user has a high overall affinity, or details about a party hosted by another user for which the user has a high overall affinity. The overall affinity may be utilized to generate and/or present any type of data to a particular user.

A media generator component 306 may, optionally, be provided as part of the affinity engine 108. The media generator component 306 utilizes the affinity determined by the affinity assignment component 304 to select and/or generate one or more items of media, such as stories. For example, the media generator component 306 can generate a story for a "User A" about a "User B" breaking up with a "User C" based on a high affinity that "User A" has for "User B" and/or "User C." The story in this instance is unique to "User A" since the relationship that "User A" has with "User B" and/or "User C" may be different than the relationship a "User D" may have with "User B" and/or "User C", for example. Any type of media, stories, content, and so forth may be generated and/or provided to the user based on the affinity.

The affinity assignment component 304 may also be utilized to assign an order to the media, the stories, the content, and so forth. For example, the story about "User B" breaking up with "User C" may be rated lower than a story about "User A's" brother having a baby, and accordingly, the story about "User B" breaking up with "User C" may appear below the story about "User A's" brother having a baby on a display page associated with "User A." Any type data may be assigned an order according to the affinity determined for the user based on the user's past or present activities and the relationships associated with the past or the present activities. According to some embodiments, the media may be generated and/or ordered according to a prediction of future user activities.

Furthermore, some user interactions may be assigned a higher weight and/or rating than other user interactions, which may affect the overall affinity. For example, if a user emails another user, the weight or the rating for the interaction may be higher than if the user simply looks at the profile page for the other user. Any type of weights or ratings may be assigned to user interactions, relationships, and so forth. Further, any type of formula or process for determining the affinity may be employed by the affinity assignment component 304.

According to exemplary embodiments, a user can utilize privacy setting selections to ensure that media regarding particular users is not included on the display page associated with the user. Alternatively, the user can request from the social network provider 106 that the user not receive data about particular users. Any type of privacy settings or requests may be provided by the user for blocking news, content, and so forth about particular users.

Figure 4:
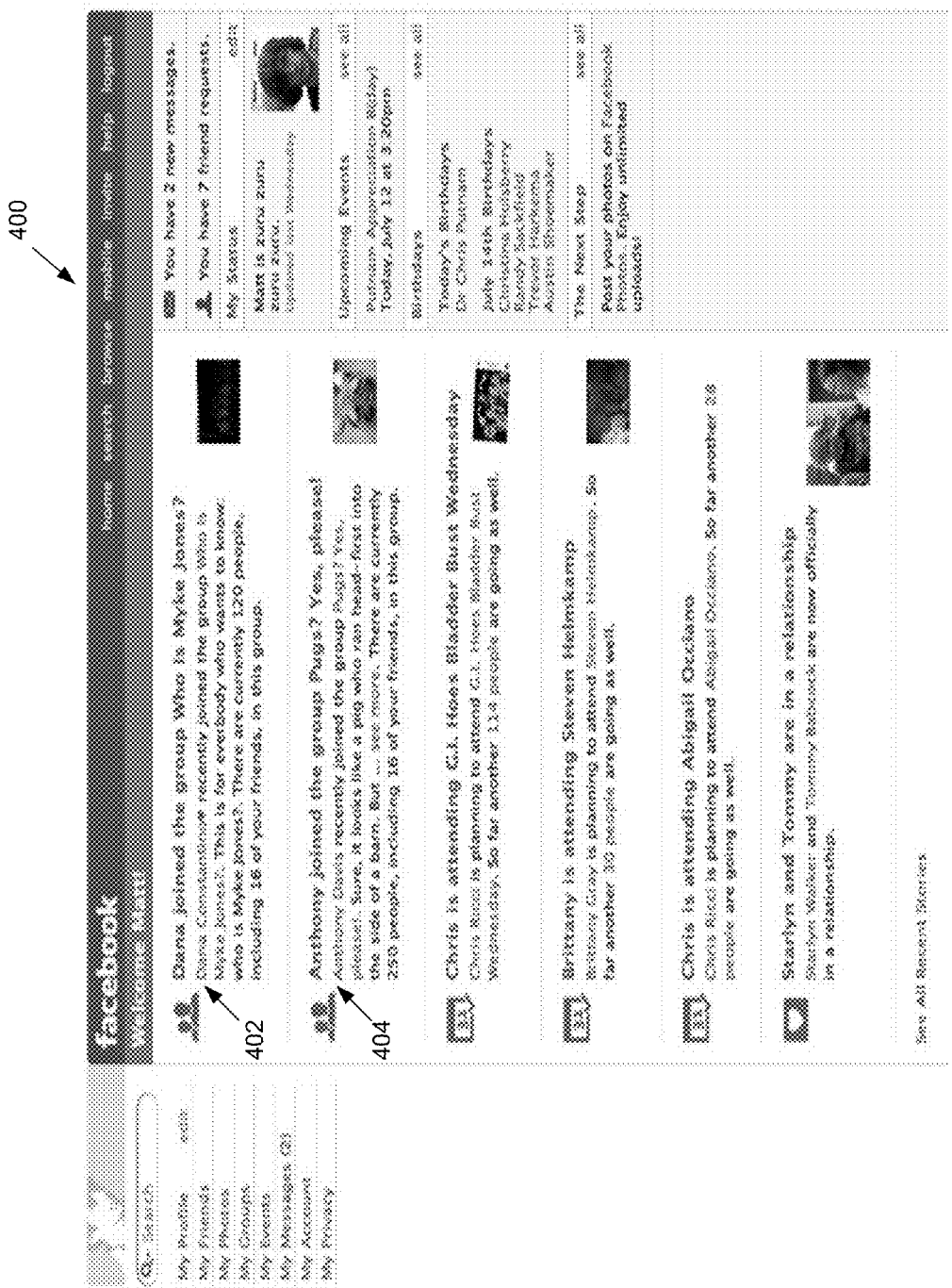
FIG. 4 illustrates an exemplary screen shot of one or more items of media displayed to a user based on user affinity.

FIG. 4 shows an exemplary screen shot 400 of one or more items of media displayed to a user based on user affinity. The exemplary screen shot 400 represents the display page associated with a particular user, such as the user at user device 102. Various stories, content, media, and so forth may be displayed via the display page. In the exemplary screen shot shown in FIG. 4, several stories and/or story headlines are displayed.

A first story 402, entitled "Dana joined the group Who is Myke Jones?" was rated highest according to affinity. As discussed herein, an overall affinity may have been assigned to each story appearing on the display page, based on the user's interaction with other content and the user's relationships associated with the user's interaction with the other content. The stories are then displayed in an order according to the affinity. For example, the first story 402 is assigned the highest order based on the affinity determined for the user for content and/or other users included in the first story 402, while a second story 404, entitled "Anthony joined the group Pugs? Yes, please!", is assigned the second highest order based on the affinity determined for the user with respect to the content and/or the other users included in the second story 404, and so forth.

Although the affinity is determined based on the one or more user activities within the social network environment, according to some embodiments, user activity outside of the social network environment may also be considered in determining overall user affinity for content and/or other users. The relationships the user has with other users affects the weights and/or the ratings of the one or more user activities, since the one or more user activities have varying significance for each user according to the one or more relationships associated with each activity the user performs, as discussed herein. For example, if a "User A" posts comments to a display page associated with "User B", who is a friend of "User A", the activity may be assigned a higher rating or weight than if "User A" posts comments to a display page associated with "User C", who is a co-worker of "User A." As discussed herein, the relationships may be obtained from categories, groups, and so forth that the user assigns to other users or from any other information the social network provider 106 obtains about the user.

Figure 5:
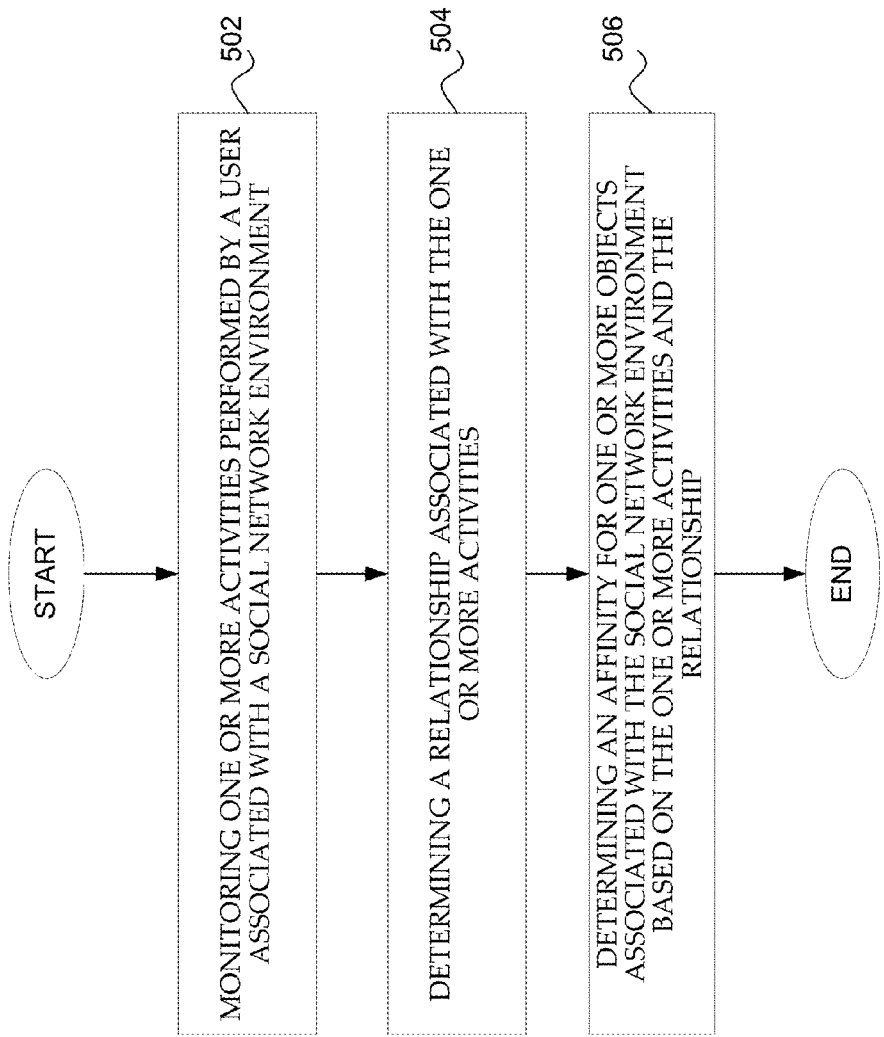
FIG. 5 illustrates a flow diagram of an exemplary process for measuring user affinity in a social network environment.

Referring now to FIG. 5, a flow diagram of an exemplary process for measuring user affinity in a social network environment is illustrated. At step 502, one or more activities performed by a user associated with a social network environment are monitored. For example, the monitoring module 206 associated with the social network provider 106 can monitor the one or more activities performed by the user. The one or more activities may include emails, viewing of user profiles, viewing of users' photos, sending messages to other user, and so forth, as discussed herein.

At step 504, a relationship associated with the one or more activities is determined. As discussed herein, the relationship database 210 can provide one or more relationships the user has with other users or content with which the user is interacting. For example, if the user accesses a profile for a "User A", the relationship database 210 can provide the data that the relationship the user has with "User A" is that "User A" is the user's girlfriend. Accordingly, the relationship associated with the user accessing the profile for "User A" is that the user is accessing the user's girlfriend's profile. More than one relationship may be associated with the one or more user activities. For example, the user's girlfriend may also cohabitate with the user and thus, the relationship database 210 may indicate a cohabitation relationship exists as well.

As discussed herein, relationships may each be assigned different weights and ratings. Similarly, the one or more user activities, such as user interactions with other users or content, may also be assigned varying weights and ratings.

At step 506, an affinity for one or more objects associated with the social network environment is determined based on the one or more activities and the relationship. The one or more objects may include other users, subject matter, categories, and so forth. The affinity may be based on an affinity weight and rating assigned to the one or more user activities and the relationship(s) associated with the one or more user activities. The one or more user activities may comprise emailing one or more other users, viewing profiles for one or more other users, viewing content posted by or for one or more other users, viewing content posted for the user, himself, and so forth. Any type of activities may be monitored and utilized to determine the affinity.

As discussed herein, one or more items of media, such as stories, photos, and so forth, may be generated, or optionally provided, based on the user affinity. According to exemplary embodiments, the affinity is updated according to the user interactions with content displayed to the user as a result of the affinity. For example, if the fifth story displayed to the user is a story about the user's best friend's ex-girlfriend and the user accesses the story first, the relationship between the user and the best friend and/or the best friend's ex-girlfriend may be assigned a higher rating. Accordingly, future stories about the user's best friend and/or the best friend's ex-girlfriend may be ranked higher than other stories.

While various embodiments have been described above, it should be understood that they have been presented by way of example only, and not limitation. For example, any of the elements associated with the affinity engine may employ any of the desired functionality set forth hereinabove. Thus, the breadth and scope of a preferred embodiment should not be limited by any of the above-described exemplary embodiments.

What is claimed is:

1. A computer-implemented method comprising:
   receiving a plurality of candidate content items for a viewing user, each content item associated with an action performed in a social networking system and each content item identifying a respective user who is connected to the viewing user in the social networking system;
   defining, for the viewing user, a first plurality of weights for a corresponding plurality of action classes, a weight for an action class indicative of a significance to the viewing user of information about actions of that action class;
   determining, by a process running on the social networking system, an affinity of the viewing user for each of the plurality of candidate content items, by:
      identifying a respective action associated with the content item,
      determining a first numeric rating for the respective action associated with the content item based on a respective relevance to the viewing user of the respective action,
      determining an action class of the plurality of action classes for the respective action, and a corresponding first weight, from among the first plurality of weights, associated with the determined action class, and
      computing the affinity for the content item based on a first weighted measure of the first numeric rating for the respective action and the first weight associated with the determined action class, the weighted measure obtained by scaling the first numeric rating by the determined first weight;
   comparing the viewing user's determined affinities across the candidate content items; and
   selecting, for display to the viewing user, one or more of the candidate content items based on the comparison.

2. The method of claim 1, further comprising:
   defining, for the viewing user, a second plurality of weights for a corresponding plurality of user groups, a weight for a user group indicative of a significance to the viewing user of information about users of that user group, wherein determining the affinity of the viewing user for each of the plurality of candidate content items further comprises:
identifying a respective user associated with the content item,
determining a second numeric rating for the respective user associated with the content item based on a respective relevance to the viewing user of the respective user,
determining a user group of the plurality of user groups for the respective user, and a corresponding second weight, from among the second plurality of weights, associated with the determined user group,
computing a second weighted measure of the second numeric rating for the respective user and the second weight associated with the determined user group, the weighted measure obtained by scaling the second numeric rating by the determined second weight, and
computing the affinity for the content item by combining the first weighted measure and the second weighted measure.

3. The method of claim 1, wherein:
the determined action class comprises actions performed by social networking system users and described in the candidate content items, the action class includes user interactions with media items, user interactions with social networking content, or user interactions with other social networking system users; and
the first weight is defined based on types of actions, a number of prior accesses, a frequency of prior accesses, or a recency of prior accesses of information about actions in the determined action class.

4. The method of claim 2, wherein:
the determined user group includes social networking system users identified by the candidate content items, the user group including social networking system users sharing a connection or a predefined type of relationship with the viewing user; and
the second weight is defined based on a nature or a strength of the viewing user's relationships with users of the determined user group.

5. The method of claim 2, wherein the first weight trends inversely with the second weight based on a relative significance to the viewing user of information about the determined action class versus information about the determined user group.

6. The method of claim 2, wherein determining the affinity of the viewing user for each of the plurality of candidate content items further comprises:
adjusting the first and second weights individually for each candidate content item; and
scaling the first numeric rating based on the adjusted first weight and scaling the second numeric rating based on the adjusted second weight.

7. The method of claim 2, further comprising:
observing the viewing user's interactions with the selected content items; and
adjusting the first and second weights based on the observed interactions.

8. The method of claim 1, wherein:
the first numeric rating for a respective action associated with the content item is determined based on a type of action, a number of prior accesses, a frequency of prior accesses, or a recency of prior accesses of information about the respective action associated with the content item.

9. The method of claim 2, wherein:
the second numeric rating for the respective user associated with the content item is determined based on a nature or a strength of the viewing user's relationship with the respective user identified by the content item.

10. The method of claim 2, wherein:
the first numeric rating for a respective action associated with the content item is determined based on historical interactions of the viewing user with information about the respective action, the first numeric rating adjusted based on a first decay factor, the first decay factor measured based on a time-varying trend of the historical interactions with information about the respective action over time; and
the second numeric rating for a respective user identified by the content item is determined based on historical interactions of the viewing user with the respective user identified by the content item, the second numeric rating adjusted based on a second decay factor, the second decay factor measured based on a time-varying trend of the historical interactions with the respective user identified by the content item.

11. The method of claim 2, wherein:
each of the plurality of content items corresponds to an image in a photo album shared by a user connected to the viewing user in the social networking system;
the respective action corresponds to an action graphically illustrated in the image or an action textually described in a comment or in caption associated with the image;
the respective user corresponds to a user who is displayed in the image or a user who is tagged in the image; and
the selecting of one or more of the candidate content items corresponds to selecting one or more images from the photo album for display, to the viewing user, as cover images of the photo album.

12. The method of claim 2, wherein:
each of the plurality of content items corresponds to a candidate social story about a user connected to the viewing user in the social networking system;
the respective action corresponds to an action that is textually described in the social story;
the respective user corresponds to an additional user identified in the social story as having performed the action; and
the selecting of one or more of the candidate content items corresponds to selecting one or more candidate social stories about the user connected to the viewing user, for display in a newsfeed to the viewing user.

13. The method of claim 2, wherein:
each of the plurality of content items corresponds to an item of information about an event associated with a user connected to the viewing user in the social networking system;
the respective action corresponds to an action that is textually described in the item of event information;
the respective user corresponds to an additional user identified in the item of event information as being associated with the respective action; and
the selecting of one or more of the candidate content items corresponds to selecting one or more items of information about the event, for display in a calendar view to the viewing user.

14. A computer program product embodied on a non-transitory computer readable storage medium including instructions, which when executed, cause a processor to:
receive a plurality of candidate content items for a viewing user, each content item associated with an action performed in a social networking system and each content item identifying a respective user who is connected to the viewing user in the social networking system;

define, for the viewing user, a first plurality of weights for a corresponding plurality of action classes, a weight for an action class indicative of a significance to the viewing user of information about actions of that action class;

determine, by the process, an affinity of the viewing user for each of the plurality of candidate content items, by:
identifying a respective action associated with the content item,
determining a first numeric rating for the respective action associated with the content item based on a respective relevance to the viewing user of the respective action,
determining an action class of the plurality of action classes for the respective action, and a corresponding first weight, from among the first plurality of weights, associated with the determined action class, and
computing the affinity for the content item based on a first weighted measure of the first numeric rating for the respective action and the first weight associated with the determined action class, the weighted measure obtained by scaling the first numeric rating by the determined first weight;

compare the viewing user's determined affinities across the candidate content items; and select, for display to the viewing user, one or more of the candidate content items based on the comparison.

15. The computer program product of claim 14, further comprising instructions that cause the processor to:
define, for the viewing user, a second plurality of weights for a corresponding plurality of user groups, a weight for a user group indicative of a significance to the viewing user of information about users of that user group,
wherein the instructions that cause the processor to determine the affinity of the viewing user for each of the plurality of candidate content items further comprise instructions that cause the processor to:
identify a respective user associated with the content item,
determine a second numeric rating for the respective user associated with the content item based on a respective relevance to the viewing user of the respective user,
determine a user group of the plurality of user groups for the respective user, and a corresponding second weight, from among the second plurality of weights, associated with the determined user group,
compute a second weighted measure of the second numeric rating for the respective user and the second weight associated with the determined user group, the weighted measure obtained by scaling the second numeric rating by the determined second weight, and
compute the affinity for the content item by combining the first weighted measure and the second weighted measure.

16. The computer program product of claim 14, wherein:
the determined action class comprises actions performed by social networking system users and described in the candidate content items, the action class includes user interactions with media items, user interactions with social networking content, or user interactions with other social networking system users; and
the first weight is defined based on types of actions, a number of prior accesses, a frequency of prior accesses, or a recency of prior accesses of information about actions in the determined action class.

17. The computer program product of claim 15, wherein:
the determined user group includes social networking system users identified by the candidate content items, the user group including social networking system users sharing a connection or a predefined type of relationship with the viewing user; and
the second weight is defined based on a nature or a strength of the viewing user's relationships with users of the determined user group.

18. The computer program product of claim 15, wherein the first weight trends inversely with the second weight based on a relative significance to the viewing user of information about the determined action class versus information about the determined user group.

19. The computer program product of claim 15, further comprising instructions that cause the processor to:
observe the viewing user's interactions with the selected content items; and
adjust the first and second weights based on the observed interactions.

20. The computer program product of claim 15, wherein:
the first numeric rating for a respective action associated with the content item is determined based on a type of action, a number of prior accesses, a frequency of prior accesses, or a recency of prior accesses of information about the respective action associated with the content item; and
the second numeric rating for the respective user associated with the content item is determined based on a nature or a strength of the viewing user's relationship with the respective user identified by the content item.

* * * * *